L. S. RAND.
Straw Cutter.
No. 4,858. Patented Nov. 18, 1846.
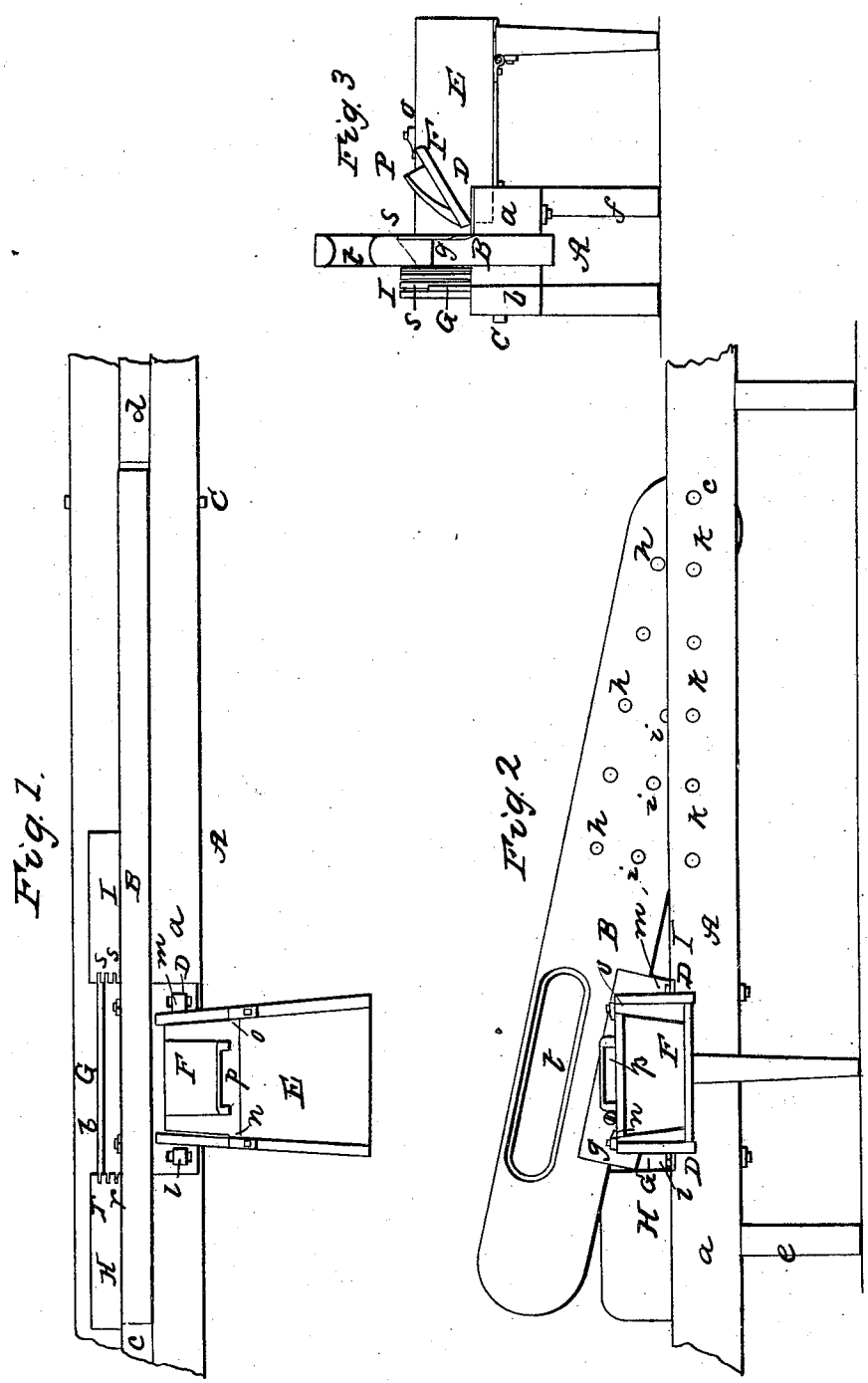

UNITED STATES PATENT OFFICE.

LUKE S. RAND, OF TOWNSHEND, VERMONT.

STRAW-CUTTER.

Specification of Letters Patent No. 4,858, dated November 18, 1846.

*To all whom it may concern:*

Be it known that I, LUKE S. RAND, of Townshend, in the county of Windham and State of Vermont, have invented a new and useful improvement in machinery for cutting fodder for cattle, including the largest corn butts, stalks, husks, and straw down to the finest hay, etc.; and I do hereby declare that the same is fully described and represented in the following specification and accompanying drawings, letters, figures, and references thereof.

The butts of the corn stalk being stiff and unyielding for cattle to eat, have heretofore been thrown into the yard to bleach. They possess more nutriment and richness than the other parts of the stalk except the ear, and being suitably cut or reduced, make good feed for most kinds of stock. Besides the manure thus gained is worth vastly more than if the stalk had bleached in the yard, as in this way the cattle are fed and the manure is increased and improved.

By my improvement I produce a highly useful and powerful machine which is well adapted to cut dry fodder as the scythe and sickle is to cut it, when green, and almost as simple and cheap.

The following description taken in connection with the accompanying drawings hereinafter referred to, forms a full and exact specification of the same, wherein are set forth the nature and principles of my said improvement, by which my machinery may be distinguished from other kinds for similar purposes, together with such parts, and combinations, as I claim, and which I wish to have secured to me by Letters Patent.

The great objections to straw cutters, which have heretofore been devised are, first, no one is made on a plan that all kinds of fodder can be cut to good advantage, for they all operate on some fixed principle which cannot be varied or graduated, to enable them to cut all kinds of fodder to good advantage. Secondly, the great expense or cost of the same, ranging from ten to thirty dollars, makes them rare in a neighborhood, or prevents those who are in want of such a machine from possessing the same. Again they are so complicated that there is much friction to be overcome, and are liable to get out of repair. Another class, costing less, requires the application to it of so much physical power, and works so slow that few men can spare the necessary time and patience to use them much.

My improved graduated feed cutter can be made at a very trifling expense, and is an article more durable and less liable to get out of repair than any other of which I am acquainted. When coarse fodder is to be cut, such as Indian corn, butts or broom corn, more sweep and weight of lever is required. In order to obtain the same (to be hereinafter described) place the gage pin near the hind end of the blade shaft. When some kinds of prairie grass and straw are to be cut they will require more or less sweep and weight of lever. The alteration needed may be effected by moving the gage pin up or down, backward or forward, into one or the other of the series of holes of the lever as the case may require. When cutting green feed to mix with provender, the said pin may be brought forward so as to cause the lever as nearly to balance, as may be desirable. In cutting tender feed there is no necessity of great sweep and weight of lever. When it is desirable to cut any hard, and thin substance, drop the rear end of the blade shaft, or lever, by moving the aforesaid gage pin, through the upper tier or series of holes, and you increase the power, or sheers power which is needed therefore it will be seen, that the above described machine possesses all the prerequisites for cutting to as good advantage as if we had a machine for every kind of fodder to be cut, and the good reason is, that the blade shaft or lever, can be so balanced or graduated as to answer every purpose that is needed, or could be accomplished by a number of machines, made in the usual form (particularly the rotary knife machine) for different kinds of fodder.

Of the aforesaid drawings, Figure 1 represents a top view and Fig. 2 a front elevation of my said machine. Fig. 3 is a vertical and transverse section of it, taken through the feeding trough and cutting knife.

A represents the main frame or standbed. It is made of two sticks *a*, *b*, of scantling or hard wood, each three inches by four in section, and six feet in length. The said pieces *a*, *b*, are arranged parallel to each other at a distance of about two inches apart, and are kept in position by two pieces of plank *c*, *d*, inserted between them at or near their adjacent ends, as seen in Fig. 1. Suitable legs *e f* &c. are applied to the frame A, in any convenient manner. Within and over the recess or space between the sticks *a b* the balance lever B of the chopping knife *g* is placed. The said balance lever is a long and heavy piece of hard wood having two or more series *h h*, &c., *i i* &c., of holes bored through it as seen in Fig. 2. A corresponding series of holes *k k* &c., is made through the two sticks *a, b,* of the frame A as also seen in said figure. A gage or fulcrum pin C, is passed through any one of the holes *k k* &c., and some one hole of the series *h h* &c., *i i* &c.

The chopping knife *g* consists of a plate of steel about fifteen inches long and three inches wide, the front side of it being ground flat, and the rear side beveled or ground down to a cutting edge. The said knife is applied to the lever B as seen in the drawings, and is confined to the said lever in any proper manner. The cutting or lower edge of the knife should be disposed somewhat below the lower edge of the lever.

D exhibits a rectangular metallic plate which is secured to the top side of the stock *a* by suitable adjusting screws *l, m,* which admit of the inner edge of the plate being moved up against, or nearly against the cutting knife.

E is a feeding trough fitted to the side of the frame A, and with respect to the cutting knife, and plate D, as seen in the drawings. An inclined board F is placed within the feeding trough, and is made to move upon suitable journals or pivots arranged at its upper ends *n, o*. The lower edge of the board F rests upon the material to be chopped, and prevents it from rising upward, when the cutting knife is elevated. There should be a box *p* affixed upon the upper side of the board F for the purpose of receiving such weights as may be desirable to keep the board down, and prevent it from being raised up, by the adhesion of the cutting knife to the material upon which it may be operating.

G denotes a gage plate, which is situated or placed in rear of the cutting knife, and confined in place by two vertical and fixed standards H I, the said standards having recesses *r r* &c. *s s* &c. cut in them to receive the ends of the plate G. By means of said recesses the distance of the plate G from the knife may be adjusted at pleasure. The plate G serves as a stop to press the ends of the straw or material to be chopped against, when the lever B is raised up. An elongated orifice *t* is made through the lever B and just below its top edge as seen in the drawings. By passing the hand partly through the said orifice, the lever may be raised or depressed. The object of the two series of holes *h h* &c. *i i* &c. is to enable a person not only to vary the angle of the cutting edge of the knife, and the edge of the aforesaid metallic plate, against which it works, but to increase, or diminish the weight of the lever as applied to the knife to assist it in increasing or diminishing its momentum, when forced downward. The several ranges of holes constitute an important feature of novelty in my peculiar straw cutter. Machinery might be attached to my straw cutter to make it more expensive, but such would not add to its utility.

My object has been to make a machine as simple and cheap as possible, one that would come within the scope or pecuniary limits of every farmer. It can be afforded for one fourth the sum, for which the rotating cylinder straw cutters can be purchased, and will do all the work that can be performed by them, and a great deal which can not be effected by them.

I am aware that I can not claim a simple knife elevated and depressed as described, but That which I do claim, is—

The improvements applied to the lever and frame of the cutting knife, in order to regulate the balance or weight of lever applied to the knife, as well as the angle of the cutting edge of the knife with respect to the plate against which it acts as above explained. Also the vibrating weighted board F in combination with the cutting knife and feeding trough, the same being for the purpose as above specified.

In testimony whereof I have hereto set my signature, this seventeenth day of June, A. D. 1846.

LUKE S. RAND.

Witnesses:
R. H. Eddy,
J. W. Waldron, Jr.